United States Patent

[11] 3,591,106

| | | | |
|---|---|---|---|
| [72] | Inventor | Elmer O. Wangerin<br>Rochester, N.Y. | |
| [21] | Appl No | 853,435 | |
| [22] | Filed | Aug. 27, 1969 | |
| [45] | Patented | July 6, 1971 | |
| [73] | Assignee | Eastman Kodak Company<br>Rochester, N.Y. | |

[54] STRIP THREADING MECHANISM
6 Claims, 4 Drawing Figs.

[52] U.S. Cl. ..................................................... 242/210,
242/192, 242/195, 242/197
[51] Int. Cl. ..................................................... G11b 15/66,
G11b 23/10
[50] Field of Search........................................... 242/195,
197, 206, 207, 208, 209, 210, 201, 198, 71.1, 71.8;
352/157, 158

[56] References Cited
UNITED STATES PATENTS
3,467,340   9/1969   Rosenburgh .................. 242/197

*Primary Examiner*—George F. Mautz
*Attorneys*—Robert W. Hampton and R. Lewis Gable ABSTRACT: In a projector or the like incorporating a film threading device embodying a roller member which engages and flexes the flanges of a film reel rotating in an unwinding direction to cause the leading end of a roll of film wound onto the reel to separate from the roll and enter a film guide channel, means are provided for automatically retracting the roller member to an inoperative position during installation and removal of a magazine loaded film reel.

PATENTED JUL 6 1971 3,591,106

ELMER O. WANGERIN
INVENTOR.

BY R. Lewis Gable
Robert W. Hampton
ATTORNEYS

3,591,106

STRIP THREADING MECHANISM

REFERENCE TO RELATED APPLICATIONS

Reference is hereby made to following commonly assigned copending U.S. Pat. applications Ser. No. 591,235 entitled "Apparatus for and Method of Feeding Strip Material" filed in the name of Norman J. Rosenburgh on Nov. 1, 1966 now U.S. Pat. No. 3,467,340; Ser. No. 730,223 entitled "Convertible Record Viewer or the Like" filed in the name of Elmer O. Wangerin on May 20, 1968; and Ser. No. 730,270 entitled "Reel Adaptor" filed in the name of Elmer O. Wangerin on May 20, 1968.

BACKGROUND OF THE INVENTION

1. Field of the Invention

The present invention relates to strip threading devices of the type in which a roller member engages and flexes the flanges of a strip reel or enclosure rotating in an unwinding direction to cause the leading end of a roll of film wound on the reel to separate from the roll and enter a film guide channel. More particularly, the invention concerns the provision of such a threading device with a mechanism for retracting the roller member automatically to an inoperative position during installation and removal of the strip reel.

2. Description of the Prior Art

As disclosed in the above-identified U.S. Pat. No. 3,467,340, a strip threading device of the type referred to above comprises a spoollike roller member having two end flanges provided with inwardly tapering conical surfaces. The roller member is rotatably supported in parallel relation to a strip supply reel spindle on a pivotally movable support lever which is biased by a spring to urge the roller laterally toward the reel spindle. In order to load the subject threading device with a film reel, which may be incorporated in a unitary film supply magazine or enclosure, the operator grasps the roller member and moves it away from the spindle in opposition to the spring to allow the film reel to be installed axially onto the spindle. When the reel is in its loaded position on the spindle, the roller member may be released so that localized portions of the two reel flanges are flexed toward one another by the corresponding conical surfaces of the roller member. Accordingly, as the reel is rotated in an unwinding direction by appropriate drive means, successive portions of the reel flanges are flexed into transverse squeezing engagement with the outermost convolution of the strip roll wound on the reel. The resulting transverse distortion of the leading end of the strip causes it to move tangentially away from the strip roll and into contact with film guide surfaces partially surrounding the roll, whereby the strip is directed along a predetermined threading path defined by such guide surfaces and by other appropriate guide channel means. After the strip has been displayed and rewound onto the strip supply reel, the operator again manually grasps the roller member and holds it aside as he removes that reel from the spindle in preparation for loading the next reel.

SUMMARY OF THE INVENTION

The present invention is directed to providing a threading device of the type disclosed above with a mechanism for automatically moving the roller member away from the reel spindle to its inoperative position during the reel loading and unloading operations, thereby eliminating the need for the operator to hold the roller manually in that position while he installs or removes a film reel or reel magazine.

Various means for practicing the invention and other advantages and novel features thereof will be apparent from the following detailed description of an illustrative preferred embodiment of the invention incorporated in a film reader machine, reference being made to the accompanying drawings in which like reference numerals denote like elements.

BRIEF DESCRIPTION OF THE DRAWINGS

In the detailed description of the preferred embodiment of the invention presented below, reference is made to the accompanying drawings, in which.

DESCRIPTION OF THE ILLUSTRATIVE PREFERRED EMBODIMENT

Figure 1:
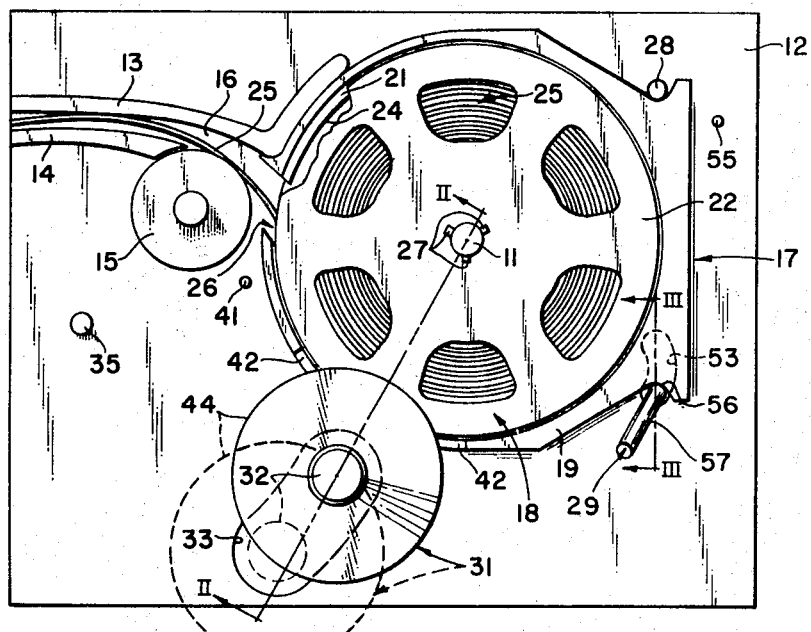
FIG. 1 is a plan view of a portion of a film reader machine provided with a threading device in accordance with a preferred embodiment of the present invention.

The film reader machine partially depicted in the accompanying drawings is of the type disclosed in greater detail in the above-identified U.S. Pat. application Ser. No. 730,223. Briefly, as shown in FIG. 1, such a reader device comprises a supply reel spindle 11 rotatably supported by a stationary support plate partially shown at numeral 12 and a corresponding film takeup reel spindle (not shown), which is similarly supported by the opposite end portion of the support plate 12. Toward the illustrated end of the support plate 12, a pair of strip guide wall members 13 and 14 and a strip guide roller member 15 cooperate to define a film guide channel 16 aligned with a film gate, (not shown), whereby a strip of sensitive material fed along guide channel 16 is directed into the gate. At the opposite end of the film gate, a similar set of film guide members defines a corresponding film guide channel by means of which the end of the strip emerging from the gate is guided into engagement with a self-threading, takeup reel mounted on a takeup reel spindle.

A film supply magazine or enclosure adapted to be installed on the loaded device is identified by numeral 17 and is generally similar to the structure disclosed in the above-identified U.S. Pat. No. 3,467,340. Such a magazine 17 comprises a strip reel 18 laterally enclosed by a magazine member 19 provided with an internal rib 21 projecting inwardly and spaced between the edges of the respective upper and lower flanges 22 and 23 (see FIG. 2). The internal rib 21 presents a guide surface 24 which laterally surrounds the roll of a strip 25 between the flanges 22 and 23 of the reel 18 except in the region of an opening 26, which extends through the magazine member 19 to define the only passageway through which the strip 25 can be withdrawn from the magazine 17.

When the magazine 17 is installed on the reader machine, the reel 18 is supported on spindle 11 and is engaged by splines 27 so that rotation of the spindle 11 is imparted to the reel 18. Additionally, wall member 13, a guide pin 28 and a cam pin 29 engage corresponding edge surfaces of the magazine member 17 to maintain the magazine 17 in a predetermined position in which the magazine 17 is concentric with the reel 18 and the opening 26 is disposed in alignment with the corresponding end of the strip guide channel 16.

Figure 2:
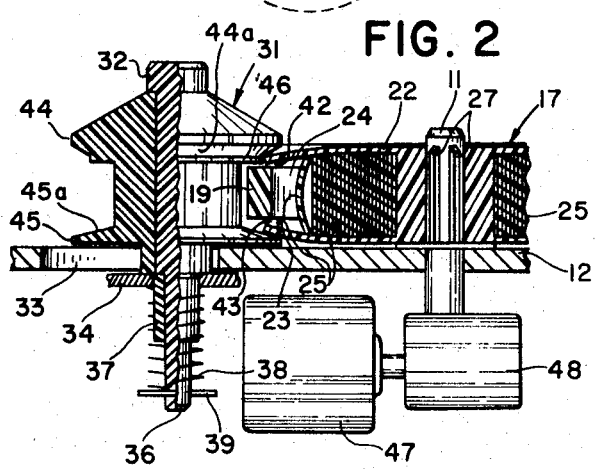
FIG. 2 is a cross-sectional view of the subject threading device taken along line II–II of FIG. 1.

As shown in FIGS. 1 and 2, a roller member 31 is rotatably supported laterally adjacent the loaded position of the magazine member 17 by a shaft 32, which extends upwardly through a slot 33 in the base plate 12 from a support lever 34 pivotally mounted below the base plate 12 by a pivot stud 35. As shown at 36, the lower end of the shaft 32 is reduced in diameter and is slidably received in a sleeve 37 attached to the corresponding end of the support lever 34. A relatively light coil spring 38 is provided between the support lever 34 and a pin 39 secured to the lower end of the shaft 32. The spring 38 resiliently biases the shaft 32 and the roller member 31 downwardly to the position shown in FIG. 2, and allows these two elements to be raised relative to the support plate 12 in opposition to the spring 38 as hereinafter described. Another coil spring 40 is connected as shown in FIG. 4 between the support lever 34 and a pin 41 projecting downwardly from the base plate 12 to bias the roller member 31 laterally toward the magazine 17.

With reference to FIGS. 1 and 2, it will be seen that the portion of the magazine 17 located adjacent the flanges of the roller member 31 when the magazine 17 is loaded onto the reader machine is provided with upper and lower recesses 42 and 43 which are adapted to accommodate respectively a pair of flanges 44 and 45 of the roller member 32. In particular, the upper and lower flanges 44 and 45 present inwardly tapering conical surfaces 44a and 45a to engage the respective upper and lower reel flanges 22 and 23 and to cause the corresponding regions of the flanges 22 and 23 to be flexed toward one another. The spring 40 resiliently maintains the roller member 31 in its operative position as established by the lateral engatement of the upper reel flange 22 with a cylindrical lip or surface 46 located below the upper conical surface 44a. Accordingly, as shown in FIG. 2, when the reel 18 is driven in an unwinding direction by appropriate drive means represented by a drive motor 47 and a gear unit 48, successive portions of the outermost convolution of the strip 25 wound on the reel 18 are flexed transversely, thereby causing the leading end of the strip 25 to separate and move tangentially away from the strip roll. As described in greater detail in the aforementioned commonly assigned copending U.S. Pat. No. 3,467,340, the leading end of the strip 25 is thus moved into contact with the inner guide surface 24 of the magazine member 17, which guides the strip 25 into the opening 26 communicating with film guide channel 16. It should be noted also that the cylindrical lip 46 serves to maintain the roller 31 slightly beyond the portion of the magazine 17 adjacent thereto to prevent interference with free rotation of the roller 31.

Figure 3:
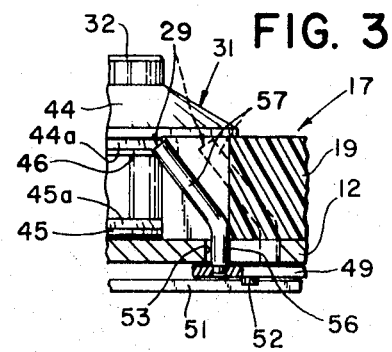
FIG. 3 is a cross-sectional view of the threading device taken along line III–III of FIG. 1.
Figure 4:
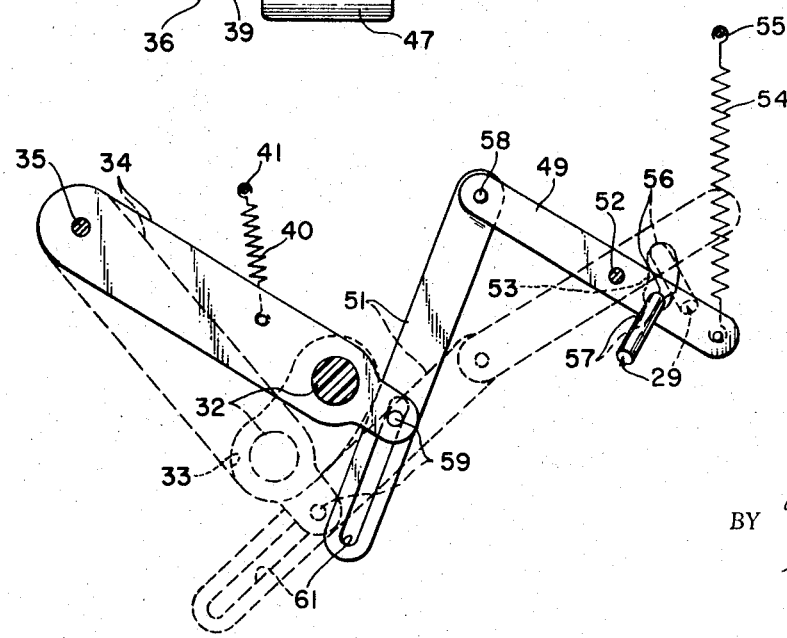
FIG. 4 is a schematic plan view of the operating mechanism incorporated in the threading device as shown in FIG. 1.

With reference to FIG. 4, it will be seen that the roller positioning mechanism according to the present invention comprises an operating lever 49 and a link arm 51 mounted below the support plate 12. The operating lever 49 is pivotally attached to the support plate 12 by pivot pin 52 and carries the previously mentioned cam pin 29, which projects upwardly through an arcuate slot 53 in the support plate 12, as shown in FIGS. 1 and 3. A relatively strong spring 54 is connected to the same end of the operating lever 49 as the cam pin 29 and is anchored to a stud 55 extending downwardly from the support plate 12 to urge the cam pin 29 toward the adjacent edge surface of the magazine 17 loaded onto the machine. As shown most clearly in FIG. 3, the cam pin 29 includes a vertical portion 56 extending somewhat above the support plate 12 and below the sloped upper portion 57 of the cam pin 29. One end of the link arm 51 is pivotally attached to the end of operating lever 49 opposite the cam pin by a rivet 58 (see FIG. 4). The other end of the link arm 49 is attached to the roller supporting end of support lever 34 by a pin 59 extending through an elongate slot 61 in the link arm 51.

When a strip magazine 17 is disposed in its loaded position on the reader machine, the vertical portion 56 of the cam pin 29 laterally engages the adjacent surface of the magazine member 17 under the influence of the spring 54, thereby positioning the operating lever 49 and the link arm 51, as shown in solid lines in FIG. 4. Accordingly, the roller 31 engages and flexes the reel flanges 22 and 23, as described above, and is not influenced by the roller positioning mechanism due to the fact that the pin 59 of support lever 34 is located between the ends of the slot 61 in the link arm 51.

To remove the magazine 17 from the machine, the operator simply grasps the magazine 17 and lifts it off of the reel spindle 11. Initially, the upward movement of the magazine member 17 is accommodated by the flexing of the upper reel flange 22 against the conical surface 44a of the roller 31 and by the corresponding upward movement of the roller 31 as its support shaft 32 slides upwardly in the sleeve 37 in opposition to the spring 38. As the magazine member 17 continues to move upwardly beyond lateral engagement with the vertical portion 56 of the cam pin 29, however, the spring 54 moves the operating lever to the position shown in phantom lines in FIG. 4. Consequently, the link arm 51 and the support lever 34 are likewise moved by spring 54 to their respective inoperative positions, also shown in phantom lines in FIG. 4, in opposition to the influence of spring 40. Thus, the roller 31 is maintained beyond engagement with the magazine 17 by spring 54 and is restored to its lower position by the spring 38.

To load another magazine 17 onto the machine, the operator simply aligns that magazine 17 with the reel spindle 11, the guide wall 13, and the guide pin 28 and then presses it downwardly to its loaded position. As shown in phantom lines in FIG. 3, the upper end of the sloped portion 57 of cam pin 29 always projects somewhat beyond the position occupied by the magazine so that the downward movement of the magazine 17 causes the cam pin 29 to be cammed aside in opposition to spring 54. Therefore, by the time the magazine 17 has been pressed downwardly to its final loaded position, the various elements of the roller positioning mechanism are restored to their respective operative positions shown in solid lines in the drawings.

As disclosed in the above-identified U.S. Pat. application Ser. No. 730,270, the reader machine or related apparatus referred to above can also be adapted to accommodate conventional film reels by means of a reel adapter which is attached to the machine in the same position occupied by a film magazine. Since the reel adapter remains in place as long as unenclosed conventional reels are being employed, the cam pin 29 of the roller positioning mechanism remains at all times in the position shown in solid lines in the accompanying drawings. Accordingly, the roller positioning mechanism cannot function in the manner just described, but, however, does not preclude the utilization of such an adapter by virtue of the fact that the elongate slot 61 in link arm 51 allows the roller 31 to be retracted manually even though the link arm 51 is positioned as shown in solid lines. Furthermore, it should be apparent that a mechanism according to the present invention could be adapted to function automatically with either magazine loaded reels or with reels accommodated by a reel adapter; for example, by employing a solenoid actuated roller positioning mechanism controlled by switch means responsive to loading and unloading movement of the film reel or magazine or responsive to the operation of a latching or ejecting device.

The invention has been described in detail with particular reference to an illustrative preferred embodiment thereof, but it will be understood that variations and modifications can be effected within the spirit and scope of the invention.

I claim:

1. Apparatus for feeding the leading end of an elongated strip of material from a roll of the strip, said roll having an axis, said apparatus including:
   a. means for supporting the roll of the strip of material for rotation about the axis of the roll;
   b. means for rotating the roll in an unwinding direction about the axis of the roll;
   c. guide means located peripherally adjacent the roll of the strip and defining a strip feed path away from the roll of the strip; and
   d. flexing means movable from a retracted position remote from the roll of the strip to an operative position spaced rearwardly in a direction of unwinding rotation of the roll of the strip from said guide means to thereby apply a transverse squeezing force to successive portions of the outer convolution of the roll of the strip as such successive portions are successively moved thereby whereby the leading end of the outer convolution is fed along said strip feed path, the improvement comprising:
   e. positioning means for moving said flexing means to said operative position in response to the loading of the roll of the strip onto said means for supporting and to said retracted position in response to the unloading of the roll of the strip from said means for supporting.

2. In apparatus for separating the leading end of an elongated strip from a convoluted roll of the strip carried by a reel including two resiliently flexible flanges for receiving the convoluted roll therebetween, the roll having an axis, said apparatus comprising:
  a. support means for supporting the reel for rotation about an axis of the roll carried by said support means;
  b. drive means for imparting unwinding rotation to the reel and the roll so supported by said support means; and
  c. flange flexing means movable from a retracted position remote from the reel when the reel is disposed upon said support means, to an operative position at which said flange flexing means engages opposed area of the two flanges as the reel is rotated past said flange flexing means by said drive means to thereby flex successive opposed regions of said two flanges toward each other and into transverse squeezing engagement with successive portions of the outermost convolution of the strip on the roll; the improvement comprising;
  d. positioning means for moving said flange flexing means to said operative position in response to loading of the reel onto said support means and to said retracted position in response to the unloading of the reel from said support means.

3. Apparatus as claimed in claim 2, wherein said positioning means includes an operating member responsive to the loading of the reel onto said support means to move from a first position to a second position, and means for translating the movement of said operating member from first to said second position to effect the movement of said flange flexing means from said retracted position to said operative position.

4. Apparatus as claimed in claim 3, wherein said means for translating movement includes a linkage member for coupling said operating member to said flange flexing means, said linkage member being associated with said operating member to permit the movement of said flange flexing means to said retracted position when said operating member is disposed in said second position.

5. Apparatus as claimed in claim 2, wherein said flange flexing means comprises a roller having first and second surfaces for engaging the flexible flanges of the reel, said roller being movable along a path substantially parallel to the axis of the roll from a third position wherein said first and second surfaces engage the flanges of the reel while the reel is supported by said support means, to a second position wherein the reel may be removed from said support means, and spring means for biasing said roller to said third position.

6. Apparatus as claimed in claim 2, wherein said positioning means includes a reel sensing member providing a cam surface for engagement with the reel, said reel sensing member being movable in response to the engagement of said cam surface with the reel from a first position to a second position, spring means for biasing said reel sensing means to said first position, and means for coupling said reel sensing member to said flange flexing means for moving said flange flexing means to said second position in response to the movement of said reel sensing means from said first position to said operative position, and to said retracted position in response to the movement of said reel sensing means from said second position to said first position by said spring means.